(12) United States Patent
Jablonsky (10) Patent No.: US 11,927,048 B1
(45) Date of Patent: Mar. 12, 2024

(54) STACKABLE SHIMS

(71) Applicant: ALP Supply, Inc., Fairless Hills, PA (US)

(72) Inventor: David S. Jablonsky, Washington Crossing, PA (US)

(73) Assignee: ALP Supply, Inc., Fairless Hills, PA (US)

( * ) Notice: Subject to any disclaimer, the term of this patent is extended or adjusted under 35 U.S.C. 154(b) by 102 days.

(21) Appl. No.: 16/882,862

(22) Filed: May 26, 2020

(51) Int. Cl.
*E06B 1/64* (2006.01)
*B32B 3/28* (2006.01)
*E04B 1/04* (2006.01)

(52) U.S. Cl.
CPC ............. *E06B 1/64* (2013.01); *B32B 3/28* (2013.01); *E04B 1/04* (2013.01); *Y10T 428/24479* (2015.01)

(58) Field of Classification Search
CPC ...... E06B 1/64; E04B 1/04; Y10T 428/24661; Y10T 428/24479; Y10T 428/24678; Y10T 428/24628; Y10T 428/24669; Y10T 24/45152; Y10T 428/12354; E04C 2/326; E04C 2002/3422
See application file for complete search history.

(56) References Cited

U.S. PATENT DOCUMENTS

| | | | |
|---|---|---|---|
| 1,675,593 A * | 7/1928 | Bohnsack | E04B 2/825 52/750 |
| 1,741,478 A | 12/1929 | Vance | |
| 1,741,487 A * | 12/1929 | Vance | A47B 91/12 248/188.2 |
| 2,968,374 A * | 1/1961 | Bohnsack | E04B 2/825 52/766 |
| 4,071,213 A * | 1/1978 | Dauberger | F16L 3/1033 248/74.1 |
| 4,232,068 A | 11/1980 | Hoh et al. | |
| 4,603,542 A * | 8/1986 | Reiter | B65B 27/083 100/9 |
| 4,793,482 A | 12/1988 | Workman | |
| 4,817,794 A | 4/1989 | Workman | |
| 4,908,245 A | 3/1990 | Shah et al. | |
| 5,205,097 A | 4/1993 | Harvey | |
| 5,815,992 A | 10/1998 | Wells et al. | |
| 8,002,241 B1 * | 8/2011 | Shaw | B60P 3/36 254/5 C |
| D652,952 S * | 1/2012 | Angel | D25/113 |
| 8,813,437 B1 | 8/2014 | Spofford | |
| 9,345,325 B2 | 5/2016 | Floersch et al. | |

(Continued)

*Primary Examiner* — Brian D Mattei
*Assistant Examiner* — Omar F Hijaz
(74) *Attorney, Agent, or Firm* — Dority & Manning, P.A.

(57) ABSTRACT

A set of stackable, planar shims is provided, with each shim having a series of projections on the top surface and corresponding recesses on the bottom surface, wherein the projections overlay the recesses. Each shim may be characterized by a bisecting line, with the series of projections and recesses being a reverse image of each other, on either side of the bisecting line. Notches in opposite corners of the shims facilitate aligning the shims in an interlocking arrangement, regardless of which surfaces of the shims are pressed into contact. The projections on the surface of the shim can be arranged to create a barrier to shear forces that are perpendicular to the sides of the shim and diagonal to the sides of the shim.

17 Claims, 7 Drawing Sheets

(56) References Cited

U.S. PATENT DOCUMENTS

| | | | | |
|---|---|---|---|---|
| D932,947 S | * | 10/2021 | Su | D12/217 |
| 2003/0146422 A1 | * | 8/2003 | Funk | B60T 3/00 |
| | | | | 254/88 |
| 2009/0247378 A1 | * | 10/2009 | Carlesimo | A63B 26/00 |
| | | | | 482/141 |
| 2010/0252788 A1 | * | 10/2010 | Wickwire | B66F 7/243 |
| | | | | 254/88 |

* cited by examiner

STACKABLE SHIMS

The present invention is directed to a set of stackable shims. The shims are substantially planar-shaped, with an arrangement of projections and recesses on their top surfaces and their bottom surfaces, respectively. The shims may be used individually, or multiple shims may be stacked together to achieve the desired thickness, with the surfaces of adjacent shims interlocked, to prevent the shims from sliding relative to each other.

BACKGROUND THE INVENTION

Stackable shims are disclosed in Vance—U.S. Pat. No. 1,741,487. Each of the shims are provided with lugs projecting from the top surface and corresponding recesses on the bottom surface. The shims are designed for use in supporting an angle iron leg, which may be seated between adjacent lugs on the body of the shim.

Hoh et al.—U.S. Pat. No. 4,232,068 disclose stackable shims having upper and lower surfaces that are striated, forming alternating longitudinal grooves and ridges. The alternating grooves and ridges of adjacent shims nest together, thereby preventing lateral shifting of the shims with respect to each other.

Stackable, thermoplastic shims are, commercially available from Meadow Burke, Riverview, Florida, USA, One product has a "checkerboard" arrangement of alternating raised square sections and recessed square sections. The shims are configured to interlock with each other when stacked.

Summary a the Invention

A set of planar, stackable shims is provided incorporating at least a first and second shim. The shims may be used individually, or two, three, four, five, six or more interlocking shims may be stacked to reach the desired height, to fill a void and provide support for a structure. The shims are particularly useful for supporting precast concrete products.

The shims comprising the stackable set may be identical, so that the following description of one shim may be applied to all of the shims in the set. The shim has a top surface, with a plurality of projections distributed over the surface and extending outward therefrom. Each of the projections is characterized by a shape and a height. The shape of the projections may be the same or different. The height of the projections are substantially the same, however, so that the load bearing down on the projections is evenly distributed over the shim. Up to 50% of the area of the top surface of the shim may be represented by the area of the upper surface of the projections, in one embodiment, the area of the projections represents from 30 to 50%, in particular, from 40 to 50% of the total area of the top surface of the shim.

The shim has a bottom surface with a plurality of recesses distributed over the bottom surface and extending inward, such that a recess is positioned beneath each of the projections. The recesses have a shape and depth corresponding to the overlaying projection, provided that the recess is designed with tolerances to accept insertion of a corresponding projection on an adjacent shim in the stack, while creating sufficient friction to engage the adjacent shim and prevent separation during handling.

The shim has a first notch in one side edge and a second notch in a second side edge, opposite the first notch. An imaginary line drawn between the first notch and the second notch bisects the top surface and the bottom surface of the shim into two substantially equal areas. The arrangement of projections on the top surface of shim on either side of the bisecting line are reverse images of each other. Likewise the arrangement of recesses on the bottom surface of shim on either side of the bisecting line are reverse images of each other. In one embodiment of the invention, the shim is rectangular, and the first notch is located in one corner of the shim and the second notch is located in the opposite corner of the shim, and the bisecting line runs diagonally from the first notch to the second notch.

A second, planar shim is provided, which has substantially the same configuration as the first shim, except that the thickness of the shim may be the same, greater or less than the thickness of the first shim. The heights of the projections and the depths of the recesses, however, for the second shim are the same as for the first shim. The second shim has first and second notches corresponding to the first and second notches of the first shim.

A feature of the present invention is that the first shim and the second shim can interlock, when (i) the bottom surface of the first shim overlays the top surface of the second shim, with the first notch of the first shim aligned with the first notch of the second shim, and when (ii) the top surface of the first shim overlays the top surface of the second shim, with the first notch of the first shim and the second notch of the second shim aligned. Thus, as lone as the notches of the first and second shim align, the shims are reversible. For example, one shim can be flipped over and rotated 180°, and the respective shims will nevertheless interlock.

A stack of shims having the desired thickness can be bound together by an elastic band, such that when the first and second shims overlay each other and are interlocked, the elastic band encircles the first and second shims, with the elastic band engaging the first and second notches of the first shim and the first and second notches of the second shim.

A plurality of the projections extending from the top surface of a shim may, be polygonal in shape, for example, the projections may be triangular or hexagonal. The sides of the projections may be substantially perpendicular to the top surface of the shim, which facilitates interlocking adjacent shims together, as described herein. A feature of the present invention is that the projections may be oriented to provide a side perpendicular to forces from more than four directions. By way of example, the plurality of projections may present at least one side perpendicular to shear forces acting on the stack of shims from at least six different directions, in particular, wherein (i) at least one of the sides of the projections is perpendicular to an angle of from 0° to 60°, (ii) at least one of the sides of the projections is perpendicular to an angle of from 60° to 120°, (iii) at least one of the sides of the projections is perpendicular to an angle of from 120° to 180°, (iv) at least one of the sides of the projections is perpendicular to an angle of from 180° to 240°, (v) at least one of the sides of the projections is perpendicular to an angle of 240° to 300°, and (vi) at least one of the sides of the projections is perpendicular to an angle of 300° to 360°.

DETAILED DESCRIPTION OF THE INVENTION

Without intending to limit the scope of the invention, the preferred embodiments and features are hereinafter set forth. All of the United States patents and published patent applications cited in the specification are incorporated herein by reference.

Figure 1:
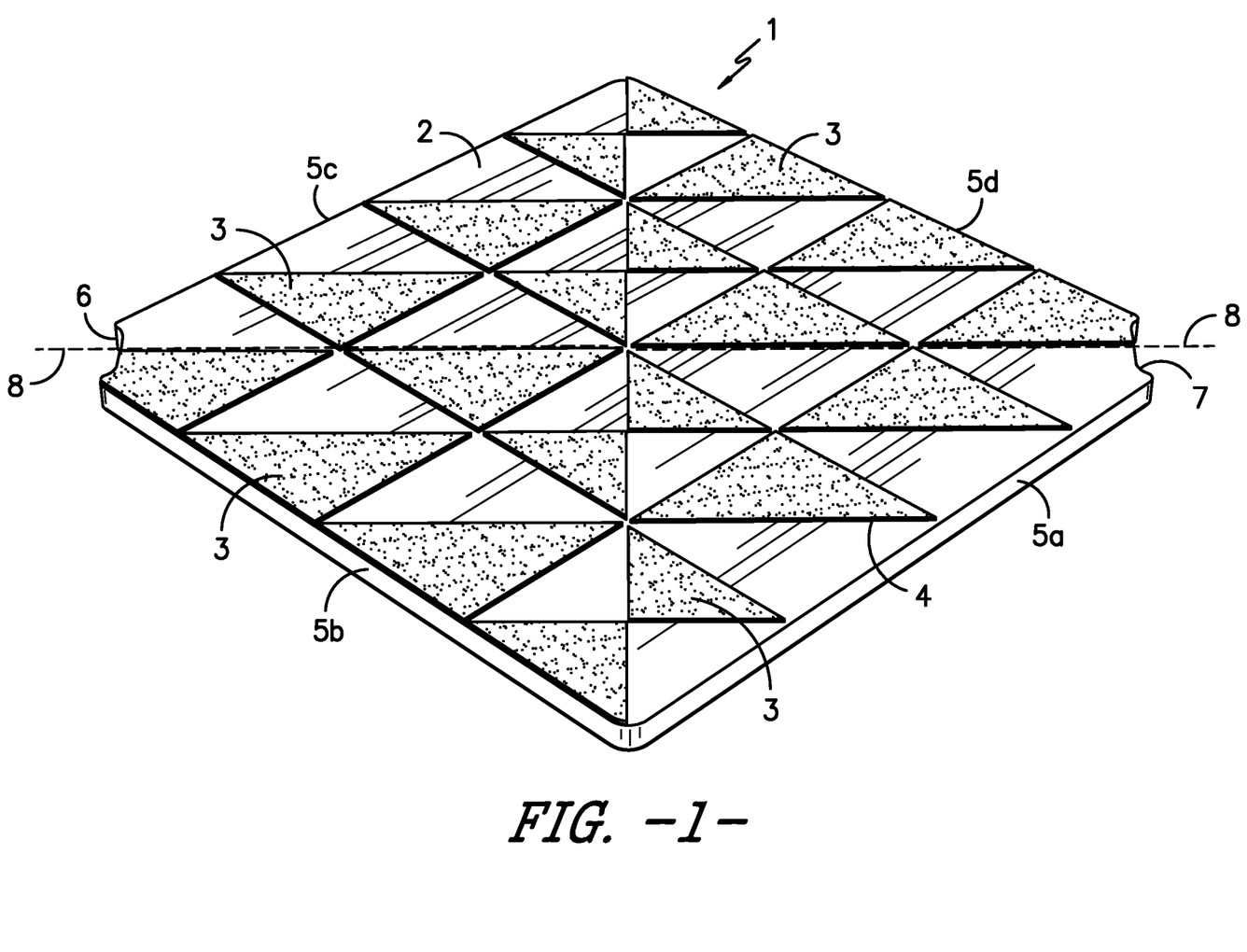
FIG. 1 is an upper perspective view of the shim.
Figure 2:
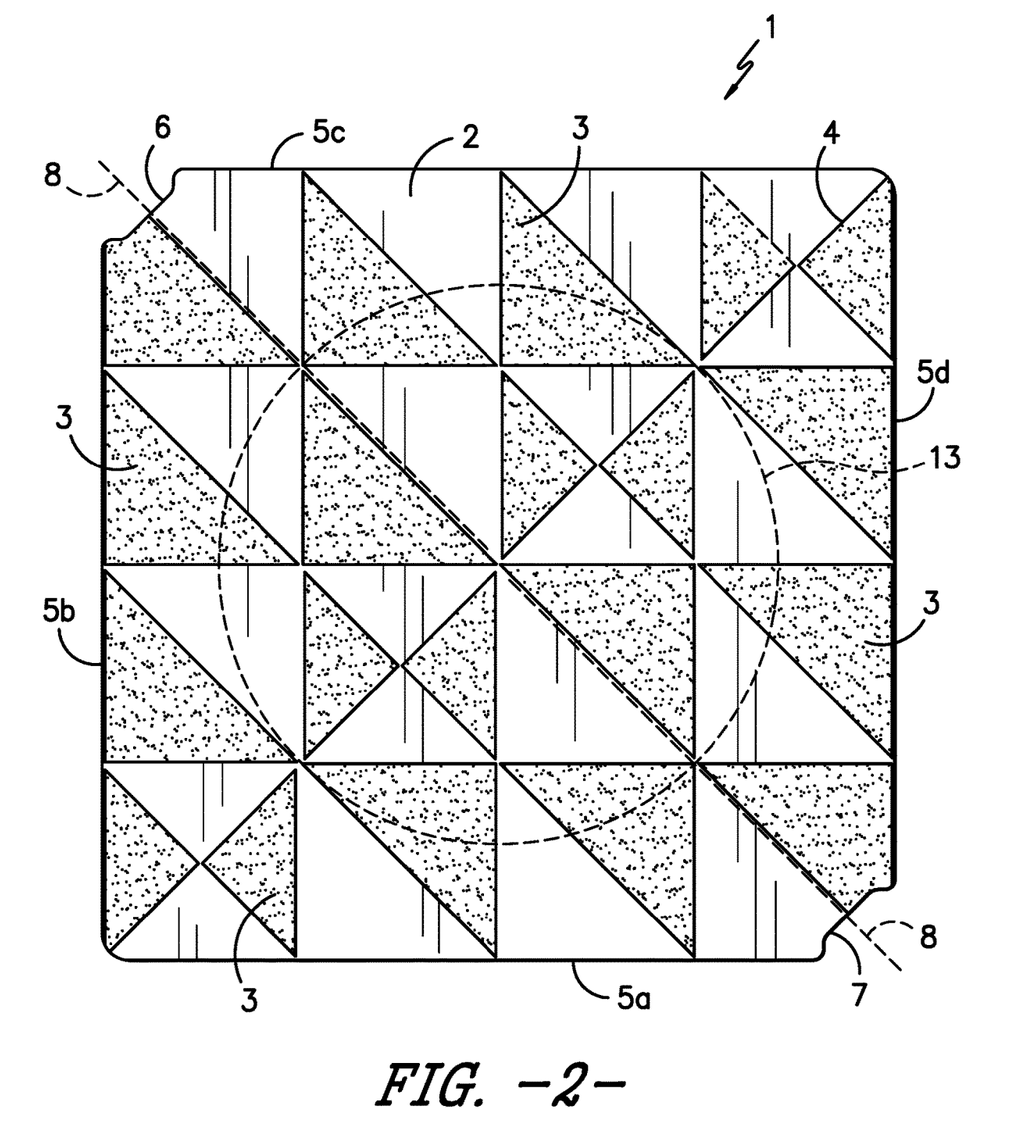
FIG. 2 is a top view of the shim.

Referring to FIGS. 1 and 2, shim 1 has top surface 2, with projections 3 distributed over approximately 50% of the surface area. Projections 3 are triangular shaped, with sides 4 substantially perpendicular to top surface 2, The triangular shape of the projections may all be right triangles. Edges 5a. 5b, 5c and 5d form the periphery of shim 1. Shim 1 is rectangular, as depicted, but may be provided in other planar shapes, such as a parallelogram, rectangle, circle or even a horseshoe shape.

Shim 1 has notch 6 in one corner and notch 7 in an opposite corner. An imaginary diagonal 8 bisects shim 1 into two equal areas. The areas on opposite sides of diagonal 8 are reverse images of each other, with respect to the shape and arrangement of projections 3.

Figure 3:
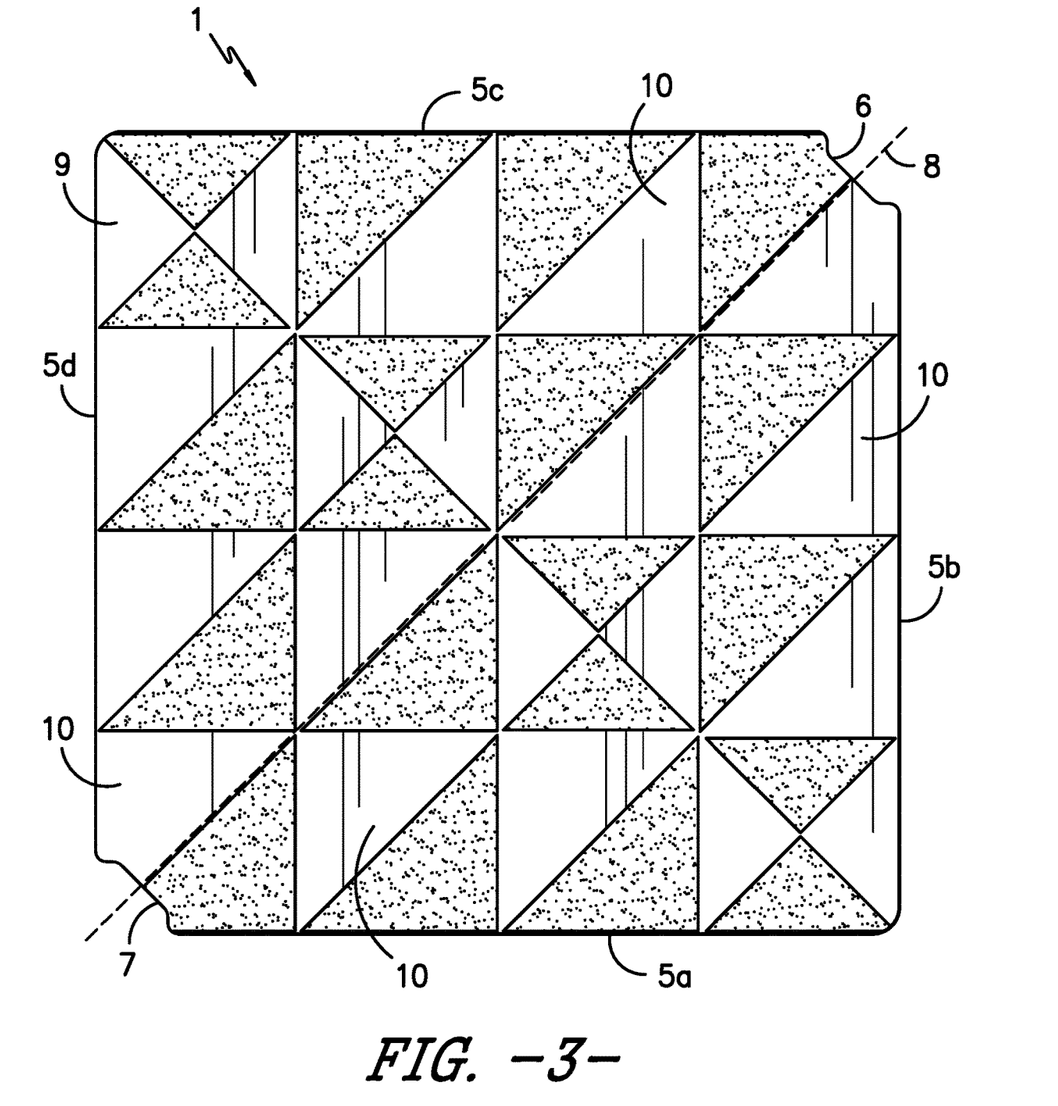
FIG. 3 is a bottom view of the shim.

FIG. 3 depicts the bottom surface 9 of shim 1. Recesses 10 extend inward and are distributed over approximately 50% of the area of bottom surface 9. The shape and are of recesses 10 correspond to projections 3 on top surface 2, that is, the shape and depth of recesses 10 match the shape and height of the particular projection overlaying the recess.

Figure 4:
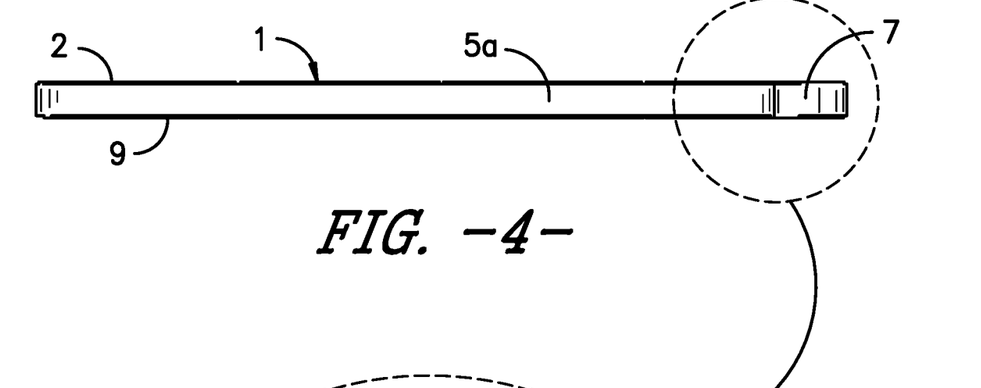
FIG. 4 is a front view of the shim depicted in FIG. 2.
Figure 5:
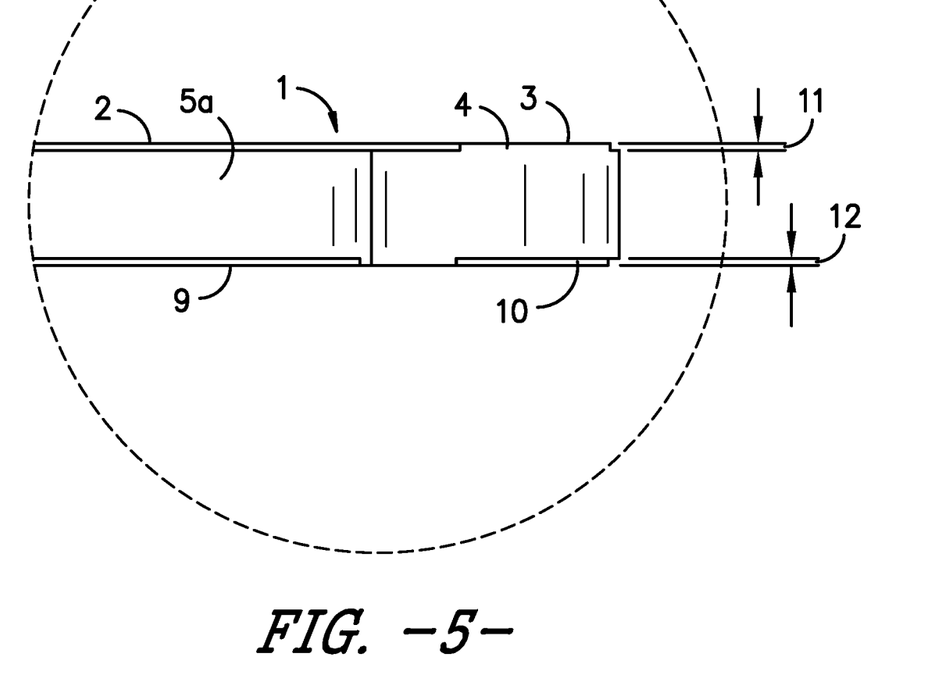
FIG. 5 is a magnified view of the front corner of the shim depicted in FIG. 4.

FIG. 4 shows shim 1 from side edge 5a. A magnified view of shim 1 is presented in FIG. 5, which shows the height 11 of projection 3 and the depth 12 of recess 10. Height 11 and depth 12 are approximately the same, so that when one shim is stacked upon another, there are no gaps in between adjacent shims, such that the projections on the lower shim are inserted in the recesses of the upper shim. By way of example, the height 11 of projection 3 may range from 0,007 to 0,022 inches, in particular, from 0,011 to 0,019 inches.

Figure 6:
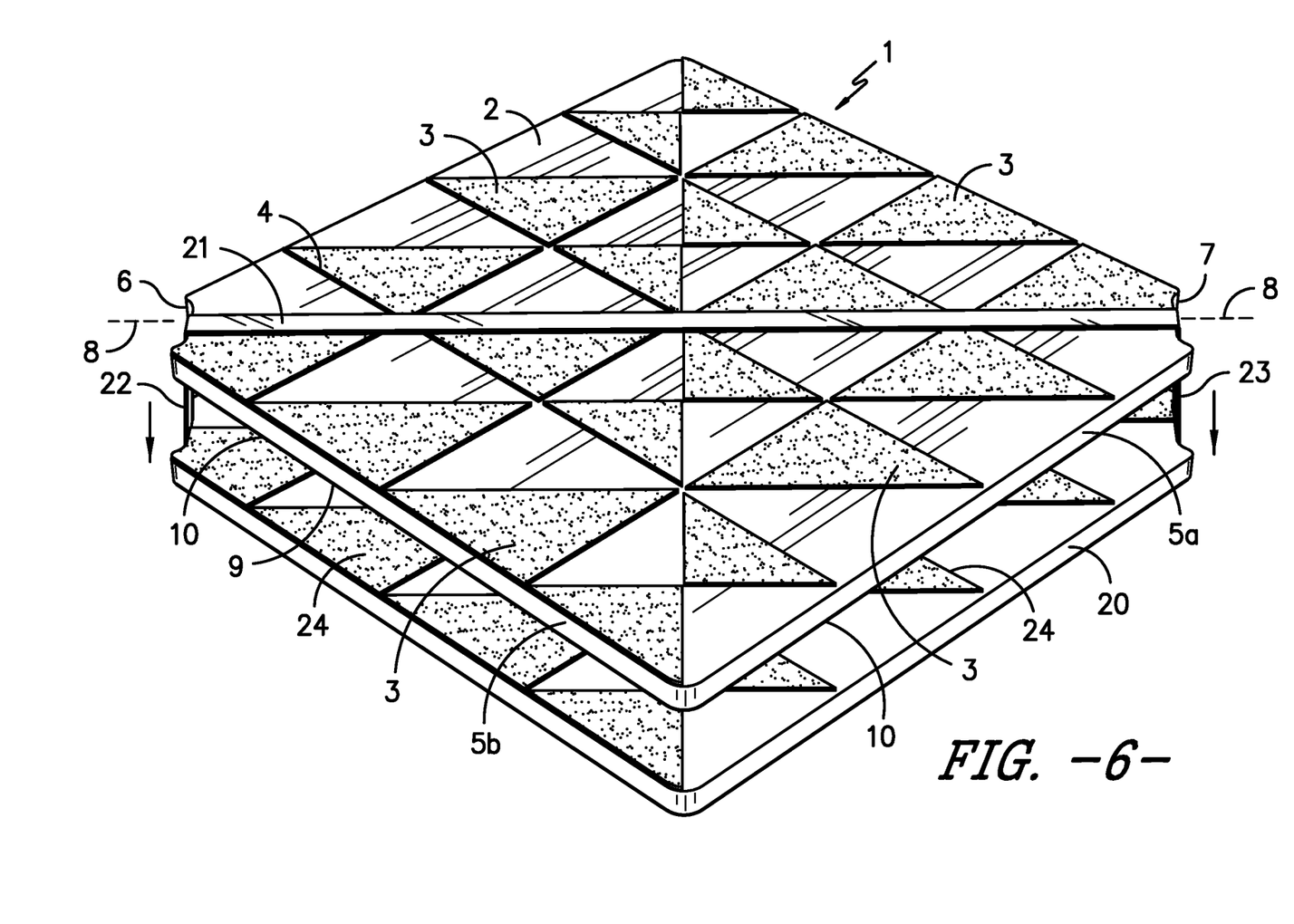
FIG. 6 is an upper perspective view of a pair of shims being stacked together.

Referring to FIG. 6, shim 1 is shown being stacked on top of shim 20, and secured by elastic band 21. Shim 20 is substantially identical to shim 1, and when pressed together, shim 1 and shim 20 interlock. Shim 20 has notch 22 in one corner and notch 23 in an opposite corner. Notches 22 and 23 of shim 20 are aligned with notches 6 and 7 of shim 1, respectively. Accordingly, projections 24 of shim 20 are inserted in recesses 10 of shim 1. Shim 1 is bisected by diagonal line 8, with the projections and flat areas on either side of diagonal line 8 being reverse images of each other. Accordingly, it is possible to flip shim 1 over and rotate it 180°, and shim 1 will interlock with shim 20. It can be understood that the notches 6 and 7 of shim 1 and notches 22 and 23 of shim 20 provide a convenient guide for aligning the shims correctly to form an interlocking stack, regardless of how shims of various thicknesses are mixed and matched.

Shim 1 and shim 20 may range in thickness from 1/16 inch to 1 inch. The thickness of each shim may be the same or different. The shims may be conveniently marketed in packs of four or more, having shims representing several different thicknesses. The thickness of the shim is measured from the top surface to the bottom surface, that is, excluding the projections and recesses, and represents the height a particular shim will add to the stack when interlocked with an adjoining shim. In one embodiment of the invention, the difference in thickness between shims in a stack may be approximately 1/16 inches or greater.

A feature of the present invention is that the projections are shaped and oriented to provide at least one side that is perpendicular to a shear force acting parallel to the top surface of the shim from more than four directions, for example from six or more directions, or even eight or more directions. By way of example, such a shear force will act to cause stacked shims to slide parallel to each other at their point of contact, that is, the top surface of one shim and the bottom surface of the adjacent shim.

Figure 7:
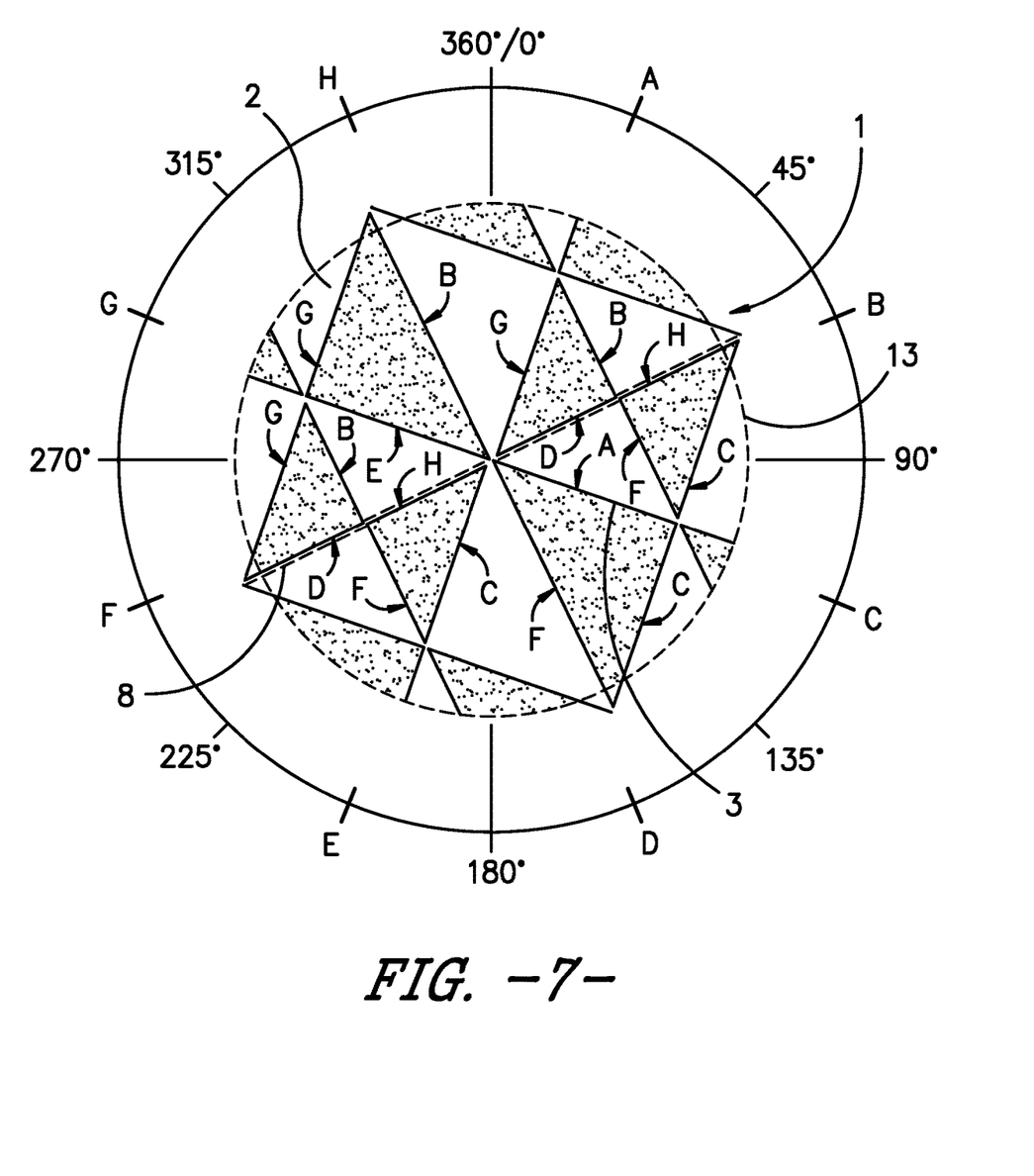
FIG. 7 is a view of the center portion of the top surface of the shim depicted in FIG. 2, which has been superimposed on a compass.

Referring to FIGS. 2 and 7, the center 13 of shim 1 is superimposed on compass 30, having graduations ranging from 0° to 360°. In one embodiment of the invention, the shim provides projections for which (i) at least one of the sides of the projections is perpendicular to an angle of from 0° to 45°, shown as direction "A" on compass 30 and on projections 3; (ii) at least one of the sides of the projections is perpendicular to an angle of from 45° to 90°, shown as direction "B" on compass 30 and on projections 3; (iii) at least one of the sides of the projections is perpendicular to an angle of from 90° to 135°; shown as direction "C" on compass 30 and on projections 3; (iv) at least one of the sides of the projections is perpendicular to an angle of from 135° to 180<, shown as direction "D" on compass 30 and on projections 3; (v) at least one of the sides of the projections is perpendicular to an angle of 180° to 225°, shown as direction "E" on compass 30 and on projections 3; (vi) at least one of the sides of the projections is perpendicular to an angle of 225° to 270°, shown as direction "F" on compass 30 and on projections 3; (vii) at least one of the sides of the projections is perpendicular to an angle of 270° to 315°, shown as direction "G" on compass 30 and on projections 3, and (viii) at least one of the sides of the projections is perpendicular to an angle of 315° to 360°, shown as direction "II" on compass 30 and on projections 3,

TABLE 1

| Direction of Force | Length of Sides Perpendicular to Force |
|---|---|
| A (0°-45°) | 1 |
| B (45°-90°) | 2.83 |
| C (90°-135°) | 2 |
| D (135°-180°) | 1.41 |
| E (180°-225°) | 1 |
| F (225°-270°) | 2.83 |
| G (270°-315°) | 2 |
| H (315°-360°) | 1.41 |
| Total | 14.48 |

It can be seen from Table 1 that with respect to each of the eight 45° increments along the compass, the shim provides that at least 5% of the projections are perpendicular to a shear force originating from each of the 45° increments, based on the total linear inches of projections.

Figure 8:
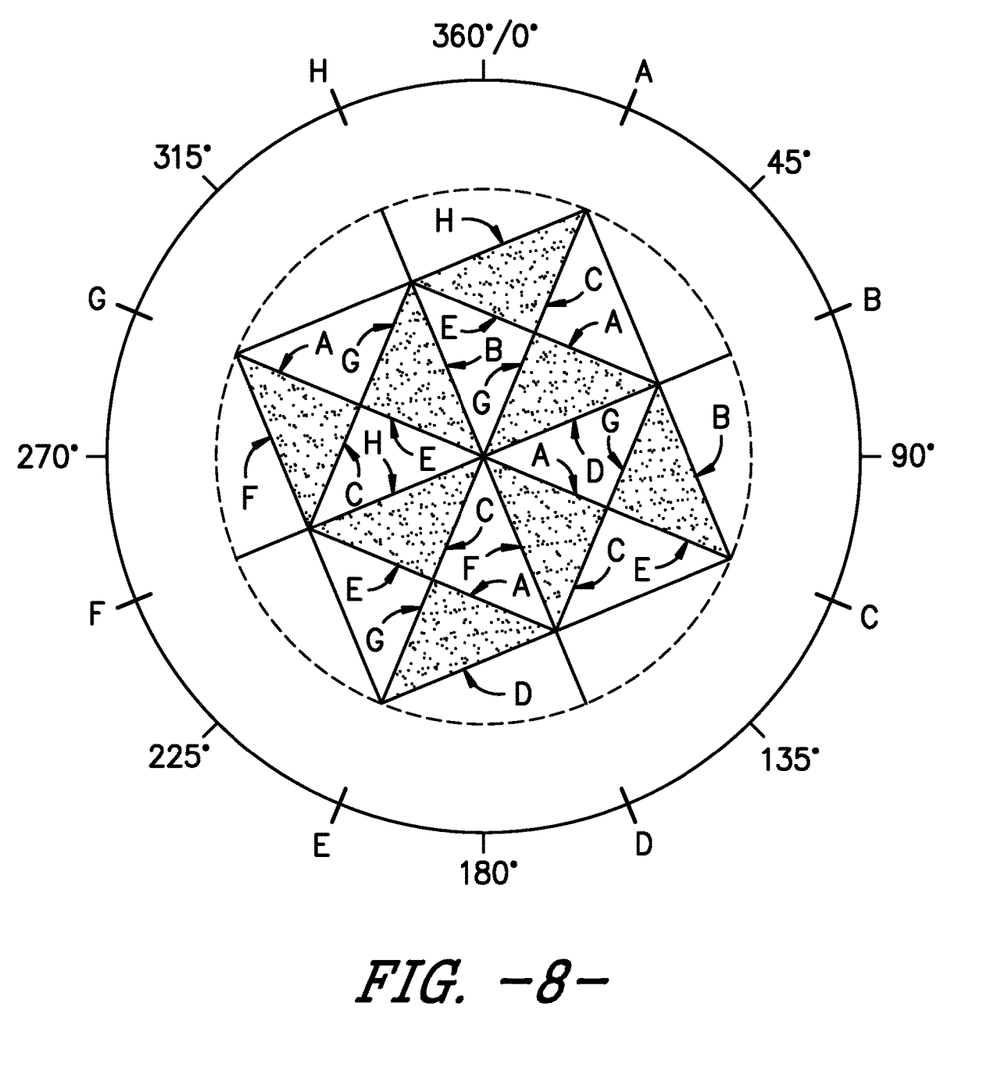
FIG. 8 is a view of the center portion of the top surface of an alternative shim design superimposed on a compass.

Referring to FIG. 8, an alternative arrangement of projections is shown, with shim 40 projected on to compass 41. Shim 40 has, top surface 42 with projections 42, which are all right triangles. The 45° increments on compass 41 are designated A-H, and correspond to the directions with respect to compass 30 in FIG. 7. The result of varying the shapes and orientations of the projections that are perpendicular to a shear force originating from any of the eight, 45° increments is shown in Table 2,

TABLE 2

| Direction of Force | Length of Sides Perpendicular to Force |
|---|---|
| A (0°-45°) | 2.83 |
| B (45°-90°) | 2 |
| C (90°-135°) | 2.83 |
| D (135°-180°) | 2 |
| E (180°-225°) | 2.83 |
| F (225°-270°) | 2 |
| G (270°-315°) | 2.83 |
| H (315°-360°) | 2 |
| Total | 19.32 |

It can be seen from Table 1 that with respect to each of the eight 45° increments along the compass, the shim provides that at least 10% of the projections are perpendicular to a shear force originating from each of the 45° increments, based on the total linear inches of projections.

The shims may be made by injection molding a suitable polymer, such as high impact polystyrene or polypropylene, as is known in the art.

There are, of course, many alternative embodiments and modifications of the invention intended to be included in the following claims.

What I claim is:

1. A pair of stackable shims comprising:
   (a) a first, planar shim having a top surface and a bottom surface, wherein the top surface has a plurality of projections extending outward and creating an upper surface and a height of each of the projections is substantially the same, wherein at least two of the plurality of projections are rotationally offset with respect to one another, wherein an area of the upper surface covers from 30% to 50% of an area of the top surface, with each of the projections characterized by a shape and a height, and wherein the bottom surface has a plurality of recesses extending inward, whereby a recess is positioned beneath each projection, with each recess having a shape approximately the same as the projection overlaying such recess and a uniform depth approximately the same as the height of the projection overlaying such recess, and a first line bisecting the first shim into first and second halves, and wherein the first and second halves of the first shim are reverse images of each other, with respect to the first bisecting line;
   (b) a second, planar shim having a top surface and a bottom surface, wherein the top surface of the second shim is identical to the top surface of the first shim and the bottom surface of the second shim is identical to the bottom surface of the first shim, and a second line bisecting the second shim into first and second halves, and wherein the first and second halves of the second shim are reverse images of each other, with respect to the second bisecting line;
   (c) wherein the first shim and the second shim can interlock, with the bottom surface of the first shim overlaying the top surface of the second shim, with the first line bisecting the first shim aligned with the second line bisecting the second shim; and
   (d) wherein the shape of the projections extending from the top surface of the first shim are polygonal, and wherein the projections extending from the top surfaces of the first shim and the second shim have sides substantially perpendicular to the top surface, and wherein (i) at least one of the sides of the projections is perpendicular to an angle of from 0° to 60°, (ii) at least one of the sides of the projections is perpendicular to an angle of from 60° to 120°, (iii) at least one of the sides of the projections is perpendicular to an angle of from 120° to 180°, (iv) at least one of the sides of the projections is perpendicular to an angle of from 180° to 240°, (v) at least one of the sides of the projections is perpendicular to an angle of 240° to 300°, and (vi) at least one of the sides of the projections is perpendicular to an angle of 300° to 360°.

2. The shims of claim 1, wherein the shape of the projections extending from the top surface of the first shim are triangular.

3. The shims of claim 1, wherein a sum of a length of the sides corresponding to each of (i) through (vi) represents 5% or greater of a total perimeter of the projections, measured parallel to the top surface of the first shim.

4. The shims of claim 3, wherein the shape of the projections extending from the top surface of the first shim are triangular.

5. The shims of claim 1, wherein a thickness of the first shim and a thickness of the second shim are different by $\frac{1}{16}$ inches or greater.

6. The shims of claim 1, wherein the height of the projections on the first and second shim are from 0.007 to 0.022 inches.

7. The shims of claim 1, wherein the height of the projections on the first and second shim are from 0.011 to 0.019 inches.

8. The shims of claim 1, wherein the area of the upper surface created by the projections on the top surface of the first shim covers from 40 to 50% of the area of the top surface.

9. The shims of claim 1, wherein the first shim and the second shim are rectangular, and the first bisecting line of the first shim extends from a first corner of the first shim to a second corner of the first shim, wherein the first corner is diagonally opposite from the second corner.

10. A pair of stackable shims, comprising:
   (a) a first, planar shim having a top surface and a bottom surface, wherein the top surface has a plurality of projections extending outward and creating an upper surface and a height of each of the projections is substantially the same, wherein at least two of the plurality of projections are rotationally offset with respect to one another, wherein an area of the upper surface covers from 30% to 50% of an area top surface, with each of the projections characterized by a shape and a height, and wherein the bottom surface has a plurality of recesses extending inward, whereby a recess is positioned beneath each projection, with each recess having a shape approximately the same as the projection overlying such recess and a uniform depth approximately the same as the height of the projection overlaying such recess, and a first line bisecting the first shim into first and second halves, and wherein the first and second halves of the first shim are reverse images of each other, with respect to the first bisecting line;
   (b) a second, planar shim having a top surface and a bottom surface, wherein the top surface of the second shim is identical to the top surface of the first shim and the bottom surface of the second shim is identical to the bottom surface of the first shim, and a second line bisecting the second shim into first and second halves, and wherein the first and second halves of the second shim are reverse images of each other, with respect to the second bisecting line;

(c) wherein the first shim and the second shim can interlock, with the bottom surface of the first shim overlaying the top surface of the second shim, with the first line bisecting the first shim aligned with the second line bisecting the second shim; and (d) wherein the shape of the projections extending from the top surface of the first shim are triangular, and wherein the projections extending from the top surface of the first shim have sides substantially perpendicular to the top surface, and wherein (i) at least one of the sides of the projections is perpendicular to an angle of from 0° to 45°, (ii) at least one of the sides of the projections is perpendicular to an angle of from 45° to 90°, (iii) at least one of the sides of the projections is perpendicular to an angle of from 90° to 135°, (iv) at least one of the sides of the projections is perpendicular to an angle of from 135° to 180°, (v) at least one of the sides of the projections is perpendicular to an angle of 180° to 225°, (vi) at least one of the sides of the projections is perpendicular to an angle of 225° to 270°, (vii) at least one of the sides of the projections is perpendicular to an angle of 270° to 315°, and (viii) at least one of the sides of the projections is perpendicular to an angle of 315° to 360°.

11. The shims of claim 10, wherein a sum of a length of the sides corresponding to each of (i) through (viii) represents 5% or greater of a total perimeter of the projections, measured parallel to the top surface of the first shim.

12. The shims of claim 10, wherein a sum of a length of the sides corresponding to each of (i) through (viii) represents 10% or greater of a total perimeter of the projections, measured parallel to the top surface of the first shim.

13. The shims of claim 10, wherein the area of the upper surface of the first shim represents from 40 to 50% of the area of the top surface.

14. The shims of claim 10, wherein a thickness of the first shim and a thickness of the second shim are different by 1/16 inches or greater.

15. The shims of claim 10, wherein the height of the projections on the first and second shim are from 0.007 to 0.022 inches.

16. The shims of claim 10, wherein the height of the projections on the first and second shim are from 0.011 to 0.019 inches.

17. The shims of claim 10, wherein the first shim and the second shim are rectangular, and the first bisecting line of the first shim extends from a first corner of the first shim to a second corner of the first shim, wherein the first corner is diagonally opposite from the second corner.

\* \* \* \* \*